(12) United States Patent
Asplund

(10) Patent No.: US 8,665,617 B2
(45) Date of Patent: Mar. 4, 2014

(54) PLANT FOR TRANSMITTING ELECTRIC POWER

(75) Inventor: Gunnar Asplund, Solna (SE)

(73) Assignee: ABB Technology AG, Zurich (CH)

( * ) Notice: Subject to any disclaimer, the term of this patent is extended or adjusted under 35 U.S.C. 154(b) by 525 days.

(21) Appl. No.: 12/997,794

(22) PCT Filed: Jun. 12, 2008

(86) PCT No.: PCT/EP2008/057363
§ 371 (c)(1),
(2), (4) Date: Dec. 28, 2010

(87) PCT Pub. No.: WO2009/149755
PCT Pub. Date: Dec. 17, 2009

(65) Prior Publication Data
US 2011/0103116 A1 May 5, 2011

(51) Int. Cl.
*H02M 1/12* (2006.01)
(52) U.S. Cl.
USPC .................................................. 363/40
(58) Field of Classification Search
USPC .............................. 363/34, 35, 37, 39, 40, 41
See application file for complete search history.

(56) References Cited

U.S. PATENT DOCUMENTS

| | | | | |
|---|---|---|---|---|
| 5,400,238 A | * | 3/1995 | Brown | 363/53 |
| 5,499,178 A | * | 3/1996 | Mohan | 363/39 |
| 5,642,275 A | * | 6/1997 | Peng et al. | 363/137 |
| 5,644,483 A | * | 7/1997 | Peng et al. | 363/37 |
| 5,901,053 A | * | 5/1999 | Eriksson et al. | 363/35 |
| 6,023,417 A | * | 2/2000 | Hava et al. | 363/41 |
| 6,717,465 B2 | * | 4/2004 | Chou et al. | 330/149 |
| 6,882,549 B2 | * | 4/2005 | Huggett et al. | 363/40 |
| 7,035,124 B2 | * | 4/2006 | Chadwick et al. | 363/40 |
| 7,606,052 B2 | * | 10/2009 | Akagi | 363/40 |
| 2004/0075424 A1 | * | 4/2004 | Chadwick et al. | 324/76.12 |

FOREIGN PATENT DOCUMENTS

RU 2 011 277 C1 4/1994

OTHER PUBLICATIONS

Fang Z. Peng et al., "A Series LC Filter for Harmonic Compensation of AC Drives", IEEE, pp. 213-218, 1999.*

* cited by examiner

*Primary Examiner* — Gary L Laxton
(74) *Attorney, Agent, or Firm* — Birch, Stewart, Kolasch & Birch, LLP

(57) ABSTRACT

A plant for transmitting electric power includes a direct voltage network (100) and at least one three-phase alternating voltage network (101) connected thereto through a station (102). This station includes a Voltage Source Converter (103). A unit (104) is configured to control the converter according to a PWM pattern for generating an alternating voltage having a third harmonic voltage part added to a fundamental voltage part. No transformer is arranged between phase outputs (106) of the converter and the alternating voltage network (101). An arrangement (107) is configured to block the third harmonic voltage part and prevent it from reaching the alternating voltage network.

14 Claims, 3 Drawing Sheets

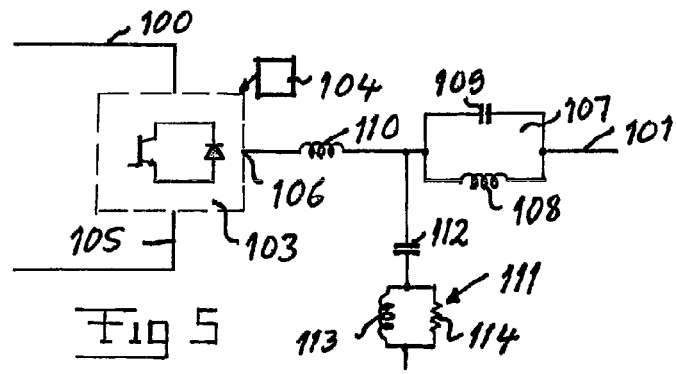
Fig 5
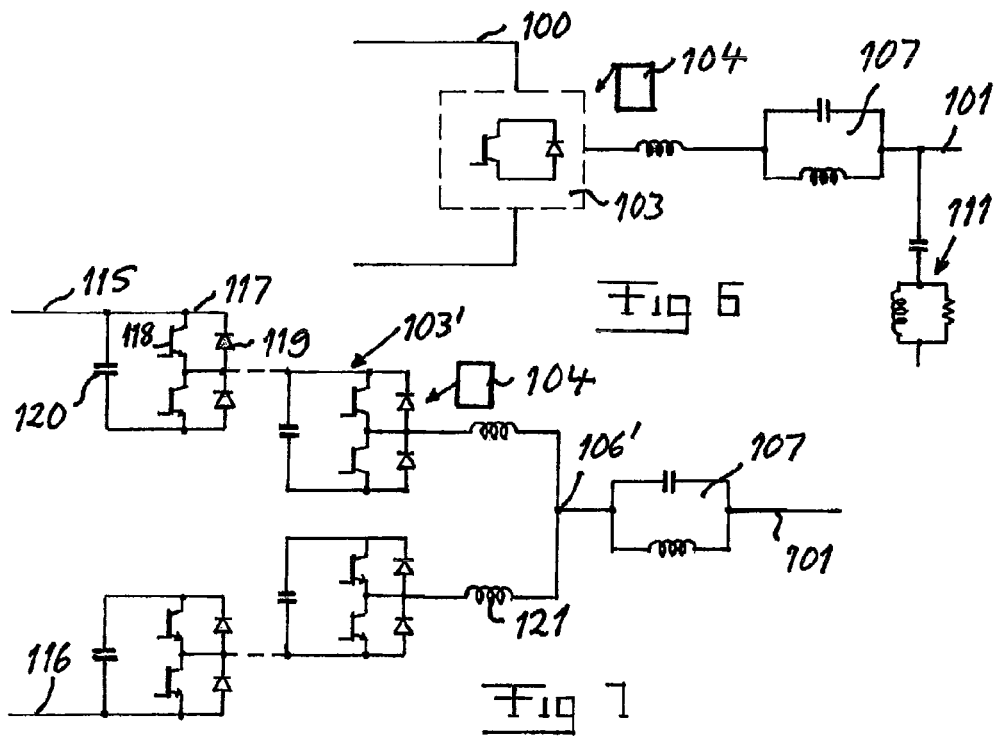
Fig 6
Fig 7
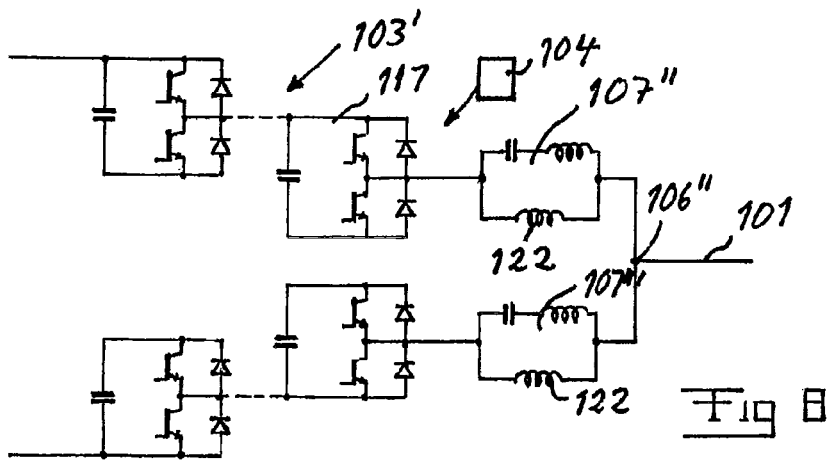
Fig 8

PLANT FOR TRANSMITTING ELECTRIC POWER

TECHNICAL FIELD OF THE INVENTION AND BACKGROUND ART

The present invention relates to a plant for transmitting electric power comprising a direct voltage network for High Voltage Direct Current and at least one three-phase alternating voltage network connected thereto through a station, in which the station is configured to perform transmitting of electric power between the direct voltage network and the alternating voltage network and comprises at least one Voltage Source Converter configured to convert direct voltage into alternating voltage and conversely and a unit configured to control said converter according to a Pulse Width Modulation (PWM) pattern for generating an alternating voltage in each of three phase legs of the converter having a third harmonic voltage part added to a fundamental voltage, where the fundamental voltage part has the same frequency as the alternating voltage on said alternating voltage network.

Plants of this type are for example known from the brochure "It's time to connect, Technical description of HVDC Light® technology", issued by ABB Power Technologies AB, Ludvika, Sweden, printed by Elanders, Västerås POW-0038 rev. 2, 2006 February.

One type of such known Pulse Width Modulation, which only adds a third harmonic voltage part to a fundamental voltage part, will be discussed below with reference made to FIGS. 1-4 for forming a base to illuminate the invention but not in any way restricting the scope thereto. The control unit of this type may utilize other types of Pulse Width Modulation adding other zero sequence voltage parts to the fundamental voltage part, such as sixth and ninth harmonic voltage parts and these are also comprised.

Furthermore, said Voltage Source Converter may be of any known type, such as two-level, three-level, multi-level Voltage Source Converter and also of the so-called Modular Multi Level Converter-type of M2LC. The frequency used for the pulses of said Pulse Width Modulation pattern is dependent upon which type of Voltage Source Converter is used, so that this frequency is typically in the order of 1 to 5 kHz for a two-level converter and 100 Hz to 500 Hz for a M2LC-converter, in which the frequency of the alternating voltage on said alternating network is typically 50 Hz or 60 Hz.

A two-level Voltage Source Converter is very schematically shown in FIG. 1. The converter 1 has three phase legs 2-4 connected between opposite poles 5, 6 of a direct voltage network 7. Each phase leg has two current valves 8-13 connected in series and a midpoint therebetween forming a phase output 14-16 and being connected through phase reactors 17 and a transformer 18 to an alternating voltage network 19.

A unit 20 is configured to control semiconductor devices 21 of turn-off type, such as IGBTs, to turn on or turn off for connecting the respective output to the potential of the pole 5 or the pole 6 and by that generating voltage pulses according to a Pulse Width Modulation pattern on the respective phase output. How this is done is conventional technique known to those with skill in the art. The phase reactors 17 will help to smooth out the alternating voltage so created.

FIG. 2 is a diagram of voltage U versus time t showing for one phase the voltage A to the left of the corresponding phase reactor in FIG. 1 when Pulse Width Modulation is carried out without adding any harmonic voltage part to a fundamental voltage part, whereas B illustrates a third harmonic voltage part that may be added to the fundamental voltage part and C illustrates the voltage obtained when adding a third harmonic voltage part to a fundamental voltage part, namely by adding the curves A and B. It appears that the third harmonic voltage part decreases the peak voltage of the converter. This means that the fundamental voltage part may be increased by as much as 15 percent with respect to the case of no addition of the third harmonic voltage part and the voltage obtained by such an addition will still remain under the limit of the converter voltage. This means that up to 15 percent rated power may be gained and the converter losses may also be reduced by around 15 percent. This is the reason for adding such a third harmonic voltage part during said Pulse Width Modulation. FIG. 3 illustrates the appearance of the converter alternating voltage U for the three phases 2-4 versus time for such a Pulse Width Modulation having a third harmonic voltage part added to a fundamental voltage part for each phase.

FIG. 4 shows the appearance of the phase voltages of FIG. 3 on the alternating voltage network 19 after having passed the transformer 19. It appears that the third harmonic voltage parts are cancelled on the alternating voltage network side of the transformer resulting in sinusoidal alternating phase voltages aimed at and having a higher peak voltage value than possible to obtain without the addition of said third harmonic voltage part.

SUMMARY OF THE INVENTION

The object of the present invention is to provide a plant of the type defined in the introduction being improved in at least some aspect with respect to such a plant already known.

This object is according to the invention obtained by providing such a plant, in which said unit is configured to control the converter to use a direct voltage for the pulses of said Pulse Width Modulation pattern being adapted to a peak value of the alternating voltage of said alternating voltage network, the alternating voltage network is connected to phase outputs of each said phase leg without any intermediate full transformer, and the plant further comprises an arrangement connected to each said phase leg and configured to block said third harmonic voltage part and to prevent it from reaching the alternating voltage network.

The present inventor has realized that for improving a plant of this type it may be possible to utilize the fact that the full transformer in HVDC applications using Voltage Source Converters has mainly the function of adapting a voltage between the alternating voltage network and the converter and is not as in line commutated HVDC transmissions an integral part of the converter. As the converter ratings and voltages are increasing it might in many cases be no strong reason to have a transformer for adapting the voltage between the alternating voltage network and the direct voltage network, since these voltages are quite the same. By taking the full transformer away there will then be a gain of both reduced cost and reduced losses. However, in order to still be able to utilize the advantages of adding a third harmonic voltage part to a fundamental voltage part in said Pulse Width Modulation the plant is provided with said arrangement configured to block said third harmonic voltage part. Thus, the increase of rated power thanks to the addition of said third harmonic voltage part may be maintained at the same time as costs are saved by dispensing with a full transformer. It is pointed out that the plant according to the invention has no full transformer, but the invention covers the case that the plant does not have any transformer at all as well as the cases of other transformers than a full transformer, such as a regulating transformer and/or an auto-controlled transformer connecting the alternating voltage network to phase outputs of each said phase leg.

According to an embodiment of the invention said arrangement comprises at least one third harmonic blocking filter with inductance and capacitance for each said phase leg. Such a third harmonic blocking filter may efficiently take away said third harmonic voltage part superimposed to the fundamental voltage produced by the converter by having said inductance and capacitance, such as in the form of an inductor and a capacitor, tuned to said third harmonic. The costs for such third harmonic blocking filters are considerably lower than for a transformer.

According to another embodiment of the invention said arrangement comprises a zero sequence reactor configured to block any zero sequence voltage parts added to said fundamental voltage part as a result of said Pulse Width Modulation. Also the replacement of a transformer by such a zero sequence reactor involves a substantial saving of costs, and said arrangement of this type makes it possible to use Pulse Width Modulation patterns adding any type of zero sequence voltage parts to a fundamental voltage part, such as for example the so called Optimal PWM, and still obtain a pure sinusoidal alternating voltage on the alternating voltage network.

According to another embodiment of the invention said zero sequence reactor comprises an iron core with three legs and one conductor winding on each leg, and each said winding is connected to an individual said phase leg of the converter in series between the phase leg and its corresponding phase line of said alternating voltage network. Such a zero sequence reactor will efficiently take away any zero sequence voltage parts added to said fundamental voltage part in the PWM, and it may basically be compared to a transformer with a rating which is less than 10 percent of the transformers usually used in HVDC plants of this type.

According to another embodiment of the invention said unit is configured to control the converter to generate an alternating voltage on each said phase leg having also other zero sequence voltage parts than a third harmonic voltage part added to said fundamental voltage part, which may advantageously be done when said arrangement comprises a zero sequence reactor.

According to another embodiment of the invention said Voltage Source Converter of said station is of the type in which each of said three phase legs connects to opposite poles of a direct voltage side of the converter and comprises a series connection of switching cells, each switching cell having on one hand at least two semiconductor assemblies having each a semiconductor device of turn-off type and a free-wheeling diode connected in anti-parallel therewith and on the other hand at least one energy storing capacitor, a mid point of said series connection forming said phase output, each said switching cell being configured to obtain two switching states by control of said semiconductor devices of each switching cell, namely a first switching state and a second switching state, in which the voltage across said at least one energy storing capacitor and a zero voltage, respectively, is applied across the terminals of the switching cell, for obtaining a determined said alternating voltage on said phase output. When utilizing such a Voltage Source Converter it will be possible to obtain voltage pulses with many different levels, so that already by means of substantially lower switching frequencies than typically used in other types of known voltage source converters an alternating voltage being very close to a sinusoidal voltage may be obtained already before any filtering is carried out resulting in low losses of such a converter. This means a further saving of costs of a plant according to the present invention.

According to another embodiment of the invention said arrangement comprises a third harmonic blocking filter connecting each half of said series connection of switching cells to said phase output of the respective phase. The phase reactor may in such an embodiment be included in the third harmonic blocking filter.

According to another embodiment of the invention the number of the switching cells of said series connection of switching cells in each said phase leg of the converter is $\geq 4$, $\geq 12$, $\geq 30$ or $\geq 50$. A converter of this type is, as already mentioned, particularly interesting when the number of switching cells of said phase leg is rather high resulting in a high number of possible levels of the voltage pulses delivered on said phase output.

According to another embodiment of the invention said arrangement is connected in series between the phase output of each said phase leg of the converter and the corresponding phase line of said alternating voltage network, which constitutes an advantageous way of connecting said arrangement for obtaining the alternating voltage aimed at on said alternating voltage network.

According to another embodiment of the invention semiconductor devices of turn-off type in said converter controlled by said unit according to said Pulse Width Modulation pattern are IGBTs (Insulated Gate Bipolar Transistor), IGCTs (Integrated Gate Commutated Thyristor) or GTOs (Gate Turn-Off Thyristor). These are suitable semiconductor devices for such converters, although other semiconductor devices of turn-off type are also conceivable.

According to another embodiment of the invention said direct voltage network has a nominal said direct voltage between two poles thereof being 10 kV to 1200 kV, 100 kV to 1200 kV or 300 kV to 1200 kV. These are typical voltages for a plant according to the present invention, and it is pointed out that a plant of this type is the more interesting the higher said direct voltage is.

According to another embodiment of the invention the alternating voltage network is connected to the phase outputs of each said phase leg without any intermediate transformer.

According to another embodiment of the invention the alternating voltage network is connected to the phase outputs of each said phase leg through a regulating transformer.

According to another embodiment of the invention the alternating voltage network is connected to the phase outputs of each said phase leg through an auto-controlled transformer.

All three embodiments last mentioned involve a considerable saving of costs with respect to the arrangement of a full transformer.

Further advantages as well as advantageous features of the invention will appear from the following description.

BRIEF DESCRIPTION OF THE DRAWINGS

With reference to the appended drawings, below follows a description of embodiments of the invention cited as examples.

In the drawings:

FIGS. 5-8 are very schematic views illustrating plants according to a first to fourth embodiment of the invention.

DETAILED DESCRIPTION OF EMBODIMENTS OF THE INVENTION

Figure 1:
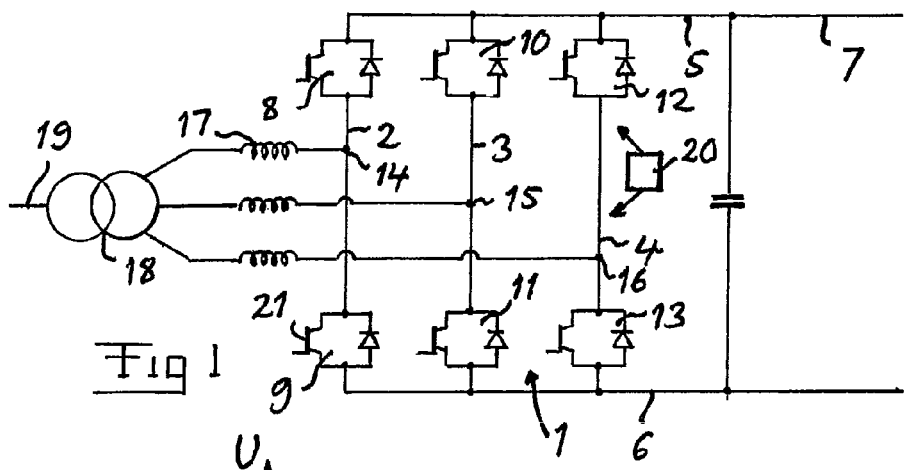
FIG. 1 is a very schematic view of a plant for transmitting electric power already known.
Figure 2:
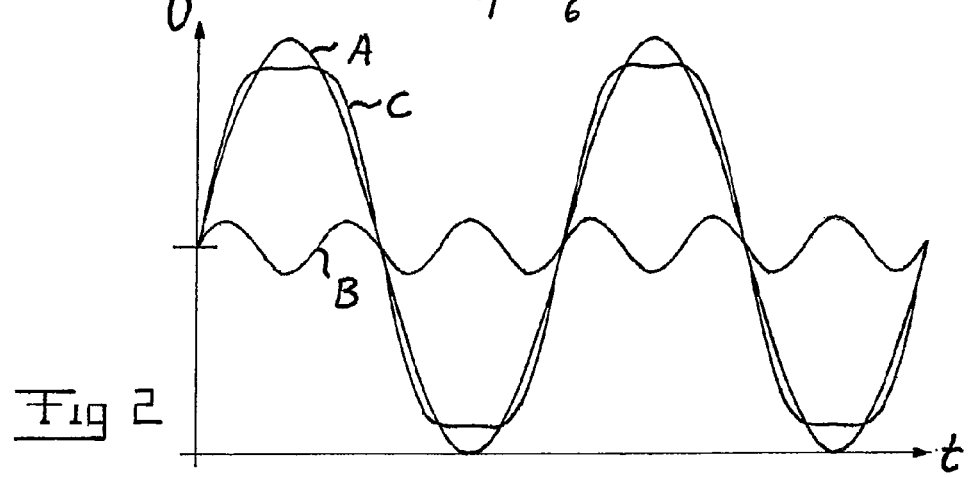
FIGS. 2-4 are diagrams of voltage versus time used to explain the reason for adding a third harmonic voltage part to a fundamental voltage part in Pulse Width Modulation.

Different embodiments of the invention will now be briefly explained with reference made to FIGS. 5-9, but it is emphasized that a great number of modifications thereof are of course possible within the scope of the invention. Furthermore, these Figures are extremely simplified for nearly only showing items that are essential for explaining the invention, so that a lot of extra equipment and the like have been left out.

FIG. 5 schematically illustrates a plant for transmitting electric power according to a first embodiment of the invention, which comprises a direct voltage network 100 for High Voltage Direct Current and one alternating voltage network 101 connected thereto. The alternating voltage network is connected to the direct voltage network through a station configured to perform transmitting of electric power between the direct voltage network and the alternating voltage network and which comprises at least one Voltage Source Converter 103, here of a two-level type or another type having no capacitors built in into switching cells thereof as a M2LC-converter. The converter is configured to convert direct voltage into an alternating voltage and conversely. The plant also comprises a unit 104 configured to control said converter according to a Pulse Width Modulation (PWM) pattern for generating an alternating voltage in each of three phase legs 105 (here summarized by a single line) of the converter having a third harmonic voltage part added to a fundamental voltage part having the same frequency, such as 50 Hz or 60 Hz, as the alternating voltage on said alternating voltage network 101.

Furthermore, the unit 104 is configured to control the converter to use a direct voltage for the pulses of said Pulse Width Modulation pattern being adapted to a peak value of the alternating voltage of the alternating voltage network, so that no transformer is needed between phase outputs 106 of each said phase leg 105 of the converter for transforming the voltage generated by the converter to the level of the voltage on the alternating voltage network 101. Moreover, the three phases of the alternating voltage network 101 and the corresponding phase outputs 106 are here summarized by showing only one phase.

Figure 3:
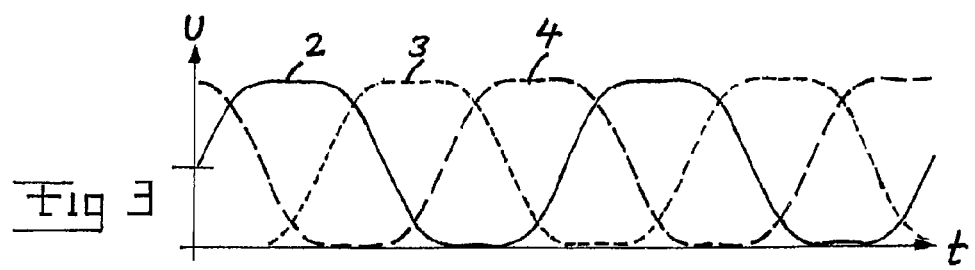
Figure 4:
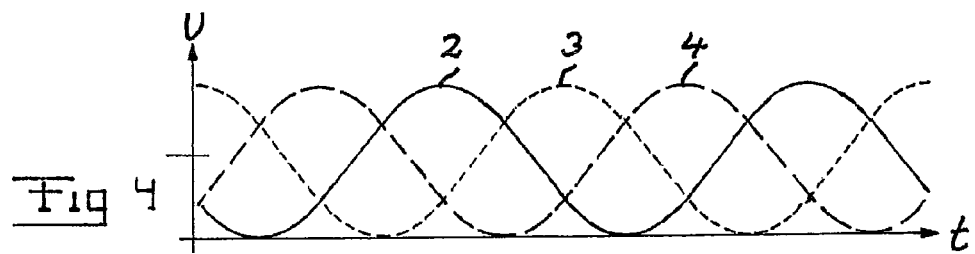

The plant further comprises an arrangement 107 connected to each said phase leg and configured to block said third harmonic voltage part and to prevent it from reaching the alternating voltage network. This arrangement 107 is in this case a third harmonic blocking filter with an inductance 108 and a capacitance 109. This filter will be tuned to said third harmonic voltage for substantially completely remove this voltage part from the voltage coming from said phase output 106 of the converter and having the appearance according to FIG. 3, so that the resulting voltage will have the appearance according to FIG. 4 on the alternating voltage network side of the filter 107.

A phase reactor 110 as well as a possible alternating voltage filter 111 having a capacitor 112, an inductance 113 and a resistance 114 for smoothing out the voltage arriving from said phase output 106 are also indicated in FIG. 5.

FIG. 6 illustrates a plant according to a second embodiment of the invention differing from the plant shown in FIG. 5 only by the fact that said alternating voltage filter 111 has been connected on the alternating voltage network side of the third harmonic blocking filter 107.

FIG. 7 illustrates a plant according to a third embodiment of the invention, in which the converter 103' is a so-called M2LC-converter of the type for instance disclosed in DE 101 03 031 A1, in which each of three phase legs connecting to opposite poles 115, 116 of the direct voltage network 100 comprises a series connection of switching cells 117, where each switching cell 117 has on one hand at least two semiconductor assemblies having each a semiconductor device 118 of turn-off type, such as an IGBT, IGCT or GTO, and a free-wheeling diode 119 connected in anti-parallel therewith and on the other hand at least one energy storing capacitor 120, in which a mid point of said series connection forms said phase output 106'. Each switching cell is configured to obtain two switching states by control of said semiconductor devices of each switching cell, namely a first switching state and a second switching state, in which the voltage across said at least one energy storing capacitor and a zero voltage, respectively, is applied across the terminals of the switching cell, for obtaining a determined said alternating voltage on said phase output. Inductances 121 here connect each half of said series connection of switching cells to the phase output 106' for forming phase reactors, but these inductances may also be built in into the switching cells.

A third harmonic blocking filter 107 is arranged in series between the phase output 106' of each phase leg of the converter and the corresponding phase line of the alternating voltage network 101. The control unit 104 configured to control the switching cells will control these with a comparatively lower frequency than for a converter according to FIGS. 5 and 6, such as in the order of 100 Hz-500 Hz compared to 1 kHz-5 kHz.

FIG. 8 illustrates a plant according to a fourth embodiment of the invention differing from the plant shown in FIG. 7 by the fact that a third harmonic blocking filter 107" is arranged to connect each half of the series connection of switching cells to said phase output 106" of the respective phase, where said phase output 106" then connects directly to the alternating voltage network 101. A phase reactor 122 is here built in into said third harmonic blocking filter 107".

Figure 9:
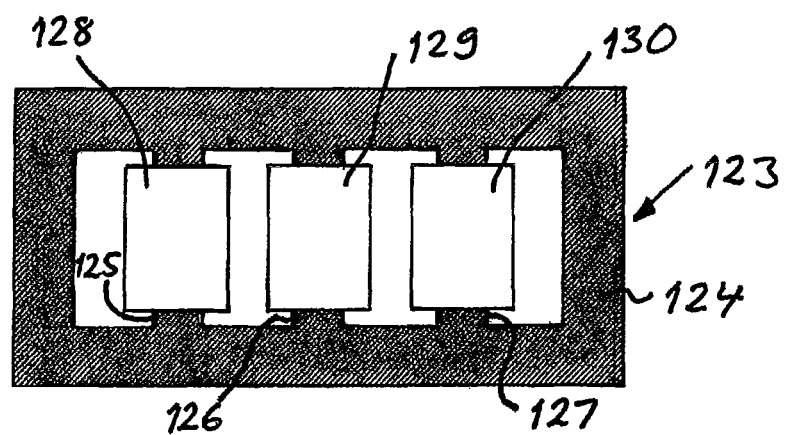
FIG. 9 is a very schematic view illustrating a zero sequence reactor included in a plant according to a fifth embodiment of the invention.

Finally, FIG. 9 illustrates a zero sequence reactor, which may replace said third harmonic blocking filters shown in the other embodiments of the invention for filtering out any zero sequence voltage parts added to said fundamental voltage part as a result of said Pulse Width Modulation carried out by the control unit 104, and not only third harmonic voltage parts. In for instance the so-called optimal PWM a number of different zero sequence harmonics are generated, and the zero sequence reactor 123 shown in FIG. 9 may take care of all of these. This zero sequence reactor may be an oil insulated device, that consists of an iron core 124 with three phase legs 125-127 and one conductor winding 128-130 on each leg. Each said winding 128-130 is connected to an individual said phase leg 105 of the converter in series between the phase leg and the corresponding phase line of said alternating voltage network 101. Such a zero sequence reactor may be used as a zero sequence blocking filter for any type of Voltage Source Converter. This zero sequence reactor may be compared to a transformer with a rating which is less than 10 percent of the transformers usually used in plants for transmitting power through High Voltage Direct Current.

The invention is of course not in any way restricted to the embodiments described above, but many possibilities to modifications thereof will be apparent to a person with ordinary skill in the art without departing from the scope of the invention as defined in the appended claims.

The invention claimed is:

1. A plant for transmitting electric power comprising a direct voltage network for High Voltage Direct Current and at least one three-phase alternating voltage network connected thereto through a station, in which the station is configured to perform transmitting of electric power between the direct voltage network and the alternating voltage network and comprises at least one Voltage Source converter configured to convert direct voltage into alternating voltage and conversely and a unit configured to control said converter according to a Pulse Width Modulation (PWM) pattern for generating an alternating voltage in each of three phase legs of the converter having a third harmonic voltage part added to a fundamental voltage part, where the fundamental voltage part has the same frequency as the alternating voltage on said alternating voltage network, wherein the direct voltage on the direct voltage network is adapted to a peak value of the alternating voltage of said alternating voltage network, the alternating voltage network is connected to phase outputs of each said phase leg without any intermediate full transformer, and the plant further comprises an arrangement connected to each said phase leg and configured to block said third harmonic voltage part and to prevent said third harmonic voltage part from reaching the alternating voltage network,
wherein said arrangement comprises at least one third harmonic blocking filter with an inductor and a capacitor for each said phase leg, and the inductor and the capacitor are connected in parallel.

2. The plant according to claim 1, wherein said Voltage Source Converter of said station is of a type in which each of said three phase legs connects to opposite poles of a direct voltage side of the converter and comprises a series connection of switching cells, each switching cell having at least two semiconductor assemblies having each a semiconductor device of turn-off type and a free-wheeling diode connected in anti-parallel therewith and at least one energy storing capacitor, a mid point of said series connection forming said phase output, each said switching cell being configured to obtain two switching states by control of said semiconductor devices of each switching cell, namely a first switching state and a second switching state, in which the voltage across said at least one energy storing capacitor and a zero voltage, respectively, is applied across the terminals of the switching cell, for obtaining a determined said alternating voltage on said phase output.

3. The plant according to claim 2, wherein said arrangement comprises a third harmonic blocking filter connecting each half of said series connection of switching cells to said phase output of the respective phase.

4. The plant according to claim 2, wherein a number of the switching cells of said series connection of switching cells in each said phase leg of the converter is ≥4, ≥12, ≥30 or ≥50.

5. The plant according to claim 1, wherein said arrangement is connected in series between a phase output of each said phase leg of the converter and a corresponding phase line of said alternating voltage network.

6. The plant according to claim 1, wherein semiconductor devices of turn-off type in said converter controlled by said unit according to said Pulse Width Modulation pattern are IGBTs (Insulated Gate Bipolar Transistor), IGCTs (Integrated Gate Commutated Thyristor) or GTOs (Gate Turn-Off Thyristor).

7. The plant according to claim 1, wherein said direct voltage network has a nominal said direct voltage between two poles thereof being 10 kV to 1200 kV, 100 kV to 1200 kV or 300 kV to 1200 kV.

8. The plant according to claim 3, wherein a number of the switching cells of said series connection of switching cells in each said phase leg of the converter is ≥4, ≥12, ≥30 or ≥50.

9. The plant according to claim 1, wherein a first terminal of the inductor and a first terminal of the capacitor are directly electrically connected to a first terminal of another inductor, a second terminal of the another inductor is directly electrically connected to the phase output of a corresponding one of the phase legs, and a second terminal of the inductor and a second terminal of the capacitor are directly electrically connected to a corresponding phase line of the alternating voltage network.

10. A plant for transmitting electric power comprising a direct voltage network for High Voltage Direct Current and at least one three-phase alternating voltage network connected thereto through a station, in which the station is configured to perform transmitting of electric power between the direct voltage network and the alternating voltage network and comprises at least one Voltage Source converter configured to convert direct voltage into alternating voltage and conversely and a unit configured to control said converter according to a Pulse Width Modulation (PWM) pattern for generating an alternating voltage in each of three phase legs of the converter having a third harmonic voltage part added to a fundamental voltage part, where the fundamental voltage part has the same frequency as the alternating voltage on said alternating voltage network, wherein the direct voltage on the direct voltage network is adapted to a peak value of the alternating voltage of said alternating voltage network, the alternating voltage network is connected to phase outputs of each said phase leg without any intermediate full transformer, and the plant further comprises an arrangement connected to each said phase leg and configured to block said third harmonic voltage part and to prevent said third harmonic voltage part from reaching the alternating voltage network,
wherein said arrangement comprises a zero sequence reactor configured to block any zero sequence voltage parts added to said fundamental voltage part as a result of said Pulse Width Modulation, and
wherein said zero sequence reactor comprises an iron core with three legs and one conductor winding on each leg, and each said winding is connected to an individual said phase leg of the converter in series between the phase leg and a corresponding phase line of said alternating voltage network.

11. The plant according to claim 10, wherein said unit is configured to control the converter to generate an alternating voltage on each said phase leg having also other zero sequence voltage parts than a third harmonic voltage part added to said fundamental voltage part.

12. The plant according to claim 10, wherein said unit is configured to control the converter to generate an alternating voltage on each said phase leg having also other zero sequence voltage parts than a third harmonic voltage part added to said fundamental voltage part.

13. The plant according to claim 10, wherein said Voltage Source Converter of said station is of the type in which each of said three phase legs connects to opposite poles of a direct voltage side of the converter and comprises a series connection of switching cells, each switching cell having on one hand at least two semiconductor assemblies having each a semiconductor device of turn-off type and a free-wheeling diode connected in anti-parallel therewith and on the other hand at least one energy storing capacitor, a mid point of said series connection forming said phase output, each said switching cell being configured to obtain two switching states by control of said semiconductor devices of each switching cell, namely a first switching state and a second switching state, in which the voltage across said at least one energy storing capacitor and a zero voltage, respectively, is applied across the terminals of the switching cell, for obtaining a determined said alternating voltage on said phase output.

14. The plant according to claim 11, wherein said Voltage Source Converter of said station is of the type in which each of said three phase legs connects to opposite poles of a direct voltage side of the converter and comprises a series connection of switching cells, each switching cell having on one hand at least two semiconductor assemblies having each a semiconductor device of turn-off type and a free-wheeling diode connected in anti-parallel therewith and on the other hand at least one energy storing capacitor, a mid point of said series connection forming said phase output, each said switching cell being configured to obtain two switching states by control of said semiconductor devices of each switching cell, namely a first switching state and a second switching state, in which the voltage across said at least one energy storing capacitor and a zero voltage, respectively, is applied across the terminals of the switching cell, for obtaining a determined said alternating voltage on said phase output.

\* \* \* \* \*